United States Patent [19]
Lee et al.

[11] Patent Number: 5,774,479
[45] Date of Patent: Jun. 30, 1998

[54] METHOD AND SYSTEM FOR REMOTE PROCEDURE CALL VIA AN UNRELIABLE COMMUNICATION CHANNEL USING MULTIPLE RETRANSMISSION TIMERS

[75] Inventors: Whay Chiou Lee, Cambridge; Yue Long Chen, Medfield; James A. Pasco-Anderson, Needham, all of Mass.

[73] Assignee: Motorola, Inc., Schaumburg, Ill.

[21] Appl. No.: 413,561

[22] Filed: Mar. 30, 1995

[51] Int. Cl.[6] .............................. H04L 1/08; G06F 11/00
[52] U.S. Cl. ................ 371/33; 395/182.16; 395/200.12; 395/200.14
[58] Field of Search ......................... 371/33; 395/182.13, 395/182.16, 200.12, 200.14

[56] References Cited

U.S. PATENT DOCUMENTS

| 5,167,035 | 11/1992 | Mann et al. | 395/182.02 |
|---|---|---|---|
| 5,282,204 | 1/1994 | Shpancer et al. | 370/94.2 |

OTHER PUBLICATIONS

Shiva, S.G., et al., "Implementation of Reliable and Efficient Remote Procedure Calls", SOUTHEASTCON 1993 IEEE Conference Proceedings, Jan. 1993.
Khalil, K.M., et al., "Performance Considerations for TCP/IP in Wide Area Networks", Local Computer Networks 1994 19th Conference, pp. 166–175, Jan. 1994.
Manzoni, P., et al., "A Simulation Study of the Impact of Mobility on TCP/IP", Network Protocols 1994 International Conference, pp. 196–203, Jan. 1994.
Bjorkman, "Designing Hierarchical Hardware for Efficient Timer Handling", '90 Workshop on Future Trends of Distributed Computing Systems, pp. 149–152, Sep. 1990.
Neufeld et al., "A Request/Response Protocol for ISO Remote Operations", IEEE Region 10 Conf. on Computers and Communication Systems, Sep. 1990, pp. 623–627.
Doyle et al., "A Simulation Model for Evaluation of Distributed Processing in Multi–Hop Packet Radio Networks", MILCOM '91, pp. 142–148, Sep. 1991.
DeSimone et al., "Throughput Performance of Transport–Layer Protocols over Wireless LANs", GLOBECOM '93, pp. 542–549, Dec. 1993.
Caceres et al., "The Effects of Mobility on Reliable Transport Protocols", 1994 Int'l Conf. on Distributed Computing Systems, pp. 12–20, Dec. 1994.
Yeo et al., "Submission of Transactions from Mobile Workstations in a Cooperative Multidatabase Processing Environment", 1994 Int'l Conf. on Distributed Computing Systems, pp. 372–379, Dec. 1994.

*Primary Examiner*—Stephen M. Baker
*Attorney, Agent, or Firm*—Darleen J. Stockley; Jeffrey T. Klayman

[57] ABSTRACT

A method (300) and communication system (400, 500, 600, 1300, 1400) provide a remote procedure call from a client to a server via an unreliable communication channel using a plurality of retransmission timers. The method includes transmitting, by the client to the server, a request and waiting for a confirm message and retransmitting, by the client to the server, the request after each of a predetermined sequence of time-out periods implemented by the plurality of retransmission timers until a confirm message is received.

14 Claims, 6 Drawing Sheets

METHOD AND SYSTEM FOR REMOTE PROCEDURE CALL VIA AN UNRELIABLE COMMUNICATION CHANNEL USING MULTIPLE RETRANSMISSION TIMERS

FIELD OF THE INVENTION

The present invention relates generally to remote procedure calls in distributed systems, and more particularly to transmission of a remote procedure call via an unreliable communication channel.

BACKGROUND

A remote procedure call from a client to a server is a widely used technique in distributed systems. The client sends a request message to a server, and then waits for the server to confirm receipt of the request message. A remote procedure call in an unreliable channel requires recovery from lost messages. Although confirm messages are used to indicate receipt of requests, the confirm messages may be lost through transmissions. Even where confirm messages are further confirmed, there may be many transmissions of confirm messages for each request. An efficient and fail-safe mechanism is needed to minimize the number of transmissions per request as well as the length of time for a lost message to be recovered.

Figure 1:
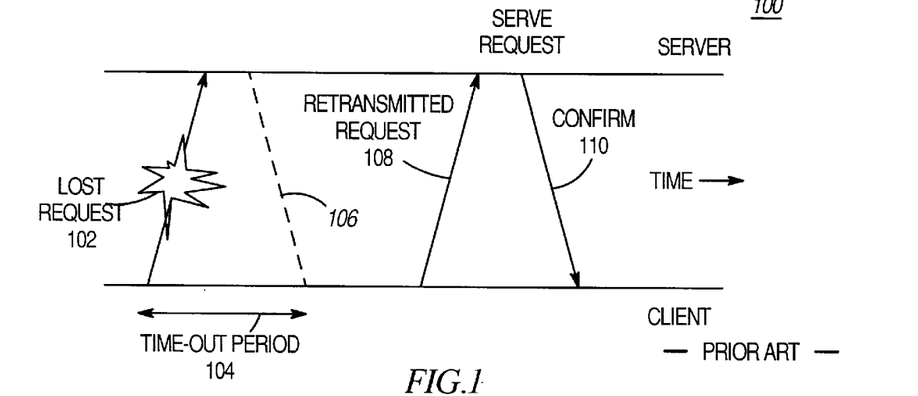
FIG. 1 shows a prior art method for recovering from a lost request utilizing a single unique time-out period per client-server pair.

As shown in FIG. 1, numeral 100, in the prior art, for recovering from a lost request, a single unique time-out period per client-server pair has been utilized for recovering a lost request. After transmitting a request (102), the client starts a timer and waits a preselected time-out period (104) for a confirm message. If the client fails to receive a confirm message prior to expiration of the timer, due to loss of the request message, loss of the confirm message (106), or an unexpectedly large round-trip delay, the client retransmits the request (108), restarts the timer, and waits for another confirm message (110). This sequence of steps is repeated as necessary, up to a predetermined limit. The time-out period is a round-trip delay for the given client-server pair. If the request message was truly lost, the server cannot tell the difference between the retransmitted request and the original one. This prior art is commonly known as the Stop-and-Wait Protocol.

Figure 2:
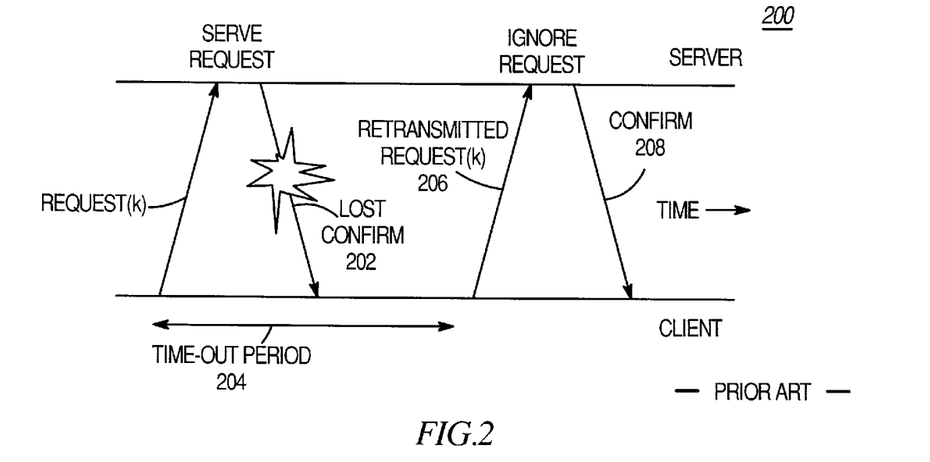
FIG. 2 shows a prior art method of recovering from a lost confirm message.

FIG. 2, numeral 200, shows a prior art method of recovering from a lost confirm message using a sequence number. When a confirm message for a given request (k) is lost (202), after a preselected time-out period (204), the request (k) is retransmitted (206), and the server ignores the request, but sends a new confirm message (208). Thus, the server keeps track of the most recently received sequence number for each request, so that it can avoid serving any request more than once. An alternative is marking the initial request for distinction from subsequent retransmissions.

In another implementation of the prior art, a process table stores one entry containing the time-out information for each process. The entire process table must be scanned periodically to identify expired timers. Although the actions of setting and clearing a timer in this approach may require only a few machine instructions, there is still a need for one timer per client-server pair.

Conventional remote procedure call methods use a timer for recovery from lost messages. If the client fails to receive a confirm message prior to the expiration of the timer, the request is retransmitted, and the timer restarted. The expiration time of the timer is often optimized with respect to the round-trip delay between the client and the server. Since different client-server pairs may be associated with different round-trip delays, as in a mesh network, each requires an exclusive timer. Processing and storage resources may be strained when the number of client-server pairs is large. By using a single timer value, a common timer may be shared, thereby avoiding having to maintain a large number of timers of different periods. However, with this approach, practically every client-server pair is assigned a timer value that is sub-optimal.

Where a remote procedure call is to be carried out over a geographically distributed network, the round-trip delay for the same client-server pair may be significantly different at different times because the connection between the client and the server may take a different path over the network. Using a time-out period that is rigidly tied to the round-trip delay may require dynamic adjustments that can add considerable complexity to the system. An invalid timer value (i.e., a value that is appropriate for one path over the network, but not for another path) for a client-server pair can degrade its throughput and delay when the conventional method for remote procedure call is used.

When prior-art remote procedure call methods are used, inaccurate estimates of the round-trip delay can result in redundant invocations of a procedure. For procedures that incur a penalty (a non-idempotent procedure), these extraneous invocations can have a serious negative impact on performance. For example, when the procedure is the resetting of a data compression encoder and decoder for the purpose of resynchronizing them, an unexpectedly large round-trip delay, relative to the estimated round-trip delay, can excessively increase the frequency of resets, significantly degrading the compression performance and throughput. When the round-trip delay is unexpectedly small and a request and/or a confirm message is lost, the resynchronization delay will be increased, degrading the throughput of the data compression connection. Thus, existing remote procedure call methods using inaccurate estimates of round-trip delay can exacerbate the harmful effects of non-idempotent procedures. Dynamically estimating the round-trip delay has become a key function in many prior-art remote procedure call methods. There is a need for a method and system for providing a remote procedure call via an unreliable communication channel using a minimized number of retransmission timers, wherein the minimized number of retransmission timers avoids problems due to sub-optimal timers and reduces sensitivity of system performance to round-trip delay.

DETAILED DESCRIPTION OF A PREFERRED EMBODIMENT

The present invention provides at least three benefits: (1) a connection with a large round-trip delay no longer suffers from long delays in recovery from a lost initial request message, nor ends up with many unnecessary retransmissions due to its timer expiring too often, and for idempotent procedures, loss of the confirm message for the initial request does not lead to long delays in recovery either; (2) since there are no time-out periods that depend rigidly on round-trip delays, the scheme is robust for remote procedure calls over a geographically distributed dynamic network topology, thus providing better quality of service over the connection; and (3) there is no need to have a timer for each client-server connection, resulting in significant saving on processing resources.

Figure 3:
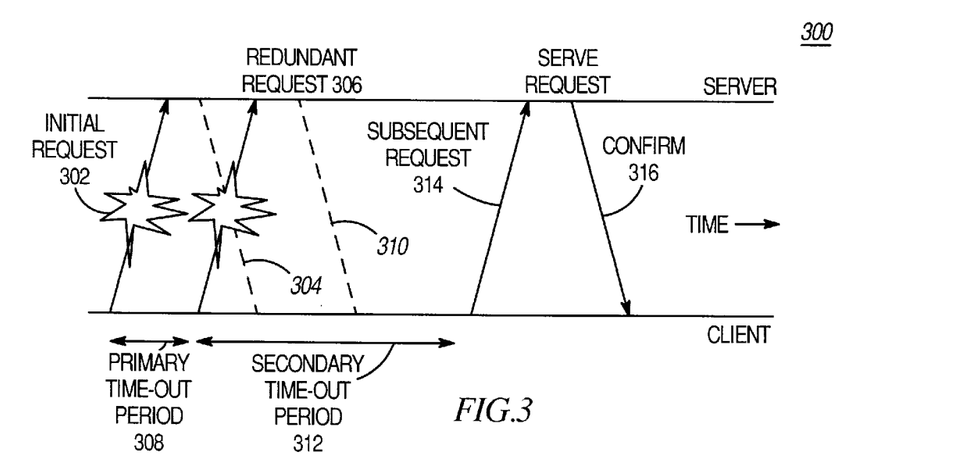
FIG. 3 illustrates steps of one embodiment of the method of the present invention along a time-line.

FIG. 3, numeral 300, illustrates steps of one embodiment of the method of the present invention along a time-line. In the process of sending a remote procedure call, a client sends an initial request (302) to a server. An initial request is the very first request that is sent by a client to invoke a predetermined remote procedure call. The present invention provides a redundant request (306) sent by the client after a predetermined primary time-out period (308) following an initial request (302). A redundant request is similar to its corresponding initial request except that the redundant request is always preceeded by the initial request. The predetermined primary time-out period (308) is preselected to be large enough to avoid possible burst errors (i.e., large enough to decorrelate error events in successive request messages, so that burst errors do not affect adjacent requests). The primary time-out period (308) is typically chosen both to be larger than the duration of burst errors and to be smaller than the smallest of the round-trip delays (i.e., the period of time between the transmission of the initial request (302) and receipt of a confirmation (304)) of the client-server pairs sharing this timer. Thus, undesirable effects of excessive delay relative to the prior-art remote procedure call methods are avoided.

Where the redundant transmission is also lost (i.e., no confirmation (310) is received), then a secondary time-out period (312) that is greater than the first time-out period is used for time-out, and the secondary time-out is repeated until a request message (314) is confirmed (316) to have been received successfully, or repeated for a predetermined number of retries to raise a success rate to an arbitrary high probability as desired by the application. The secondary time-out period (312) is typically selected to be large compared to the largest of the round-trip delays of the client-server pairs sharing the timer, and yet small compared to the time-out for disconnect of higher layer protocols. This takes advantage of the robustness of the redundant transmission and allows the full benefit of the invention relative to the prior-art methods. Depending on the application, the initial request may or may not be distinguished from the redundant as well as other subsequent requests. A subsequent request is similar to its corresponding redundant request except that the subsequent request is always preceeded by the redundant request. There may be more than one subsequent request, wherein, except for the first subsequent request, every other subsequent request must be preceeded by another subsequent request. A client may continue to send subsequent requests until a confirm message is received.

Let $T_1$ and $T_2$ denote the primary and secondary time-out periods respectively. Then, the time-out sequence for the invention is $\{T_1, T_2, T_2, T_2, \ldots\}$. As a variation of the original scheme, the primary time-out period may be repeated a predetermined number of times (e.g., $\{T_1, T_1, T_2, T_2, T_2 \ldots\}$). Another variation is to have a third order time-out with period $T_3$, that follows after the secondary timeout, and is repeated thereafter (i.e., $\{T_1, T_2, T_3, T_3, T_3, \ldots\}$). This procedure will accommodate even wider ranges of round-trip delays. Yet another variation is to alternate between the primary and secondary time-outs (i.e., $\{T_1, T_2, T_1, T_2, \ldots\}$). In general, any preselected sequence of time-out periods is possible (e.g., $\{T_1, T_2, T_3, T_4, \ldots\}$).

The redundant request effectively lowers the probability that subsequent time-outs are ultimately needed, so much so that the chance for subsequent retransmissions is practically negligible. For procedures that may be repeated as often as necessary with no incurred damage (i.e., an idempotent procedure), neither the redundant request nor other subsequent requests need to be distinguished from the initial request. For non-idempotent procedures, sequence numbers or multiple request types may be used so that the server will not end up serving the same request multiple times.

Figure 4:
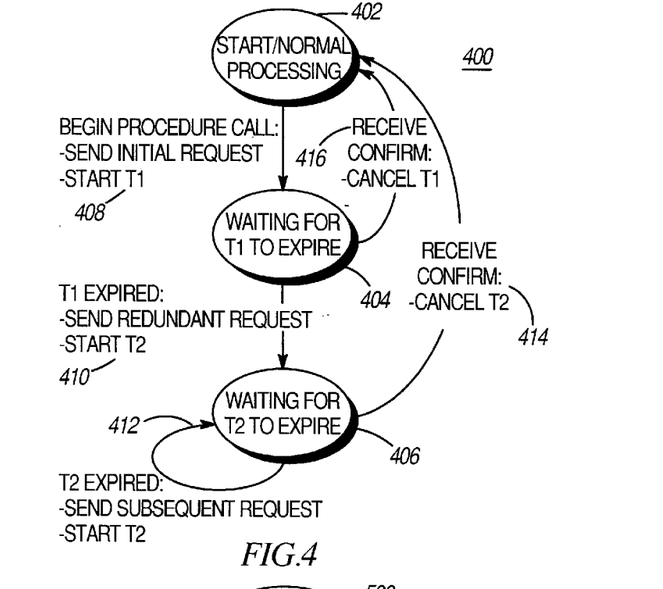
FIG. 4 shows a diagram of one embodiment of a client state machine in accordance with the present invention.

FIG. 4, numeral 400, shows a diagram of one embodiment of a client state machine in accordance with the present invention. The client state machine has three states: start/normal processing (402), waiting for the primary time-out period $T_1$ to expire (404), and waiting for the secondary time-out period $T_2$ to expire (406). Upon starting processing (402), an initial request is sent by the client and a timer is started (408), i.e., a predetermined primary time-out period $T_1$ is begun. The client then waits for $T_1$ to expire (404). Where a confirm message is received during $T_1$ (416), the client cancels $T_1$ and recycles to normal processing (402). Where $T_1$ expires without the client's receiving a confirm message, the client sends a redundant request and starts a timer (410), i.e., a predetermined secondary time-out period $T_2$ is begun. The client then waits for $T_2$ to expire (406). Where a confirm message is received during $T_2$ (414), the client cancels $T_2$ and recycles to normal processing (402). Where $T_2$ expires without the client's receiving a confirm message, the client sends a subsequent request, starts another time-out period of length $T_2$ (412), and recycles to waiting for $T_2$ to expire (406); this cycle is repeated until the client receives a confirm message (414).

Figure 5:
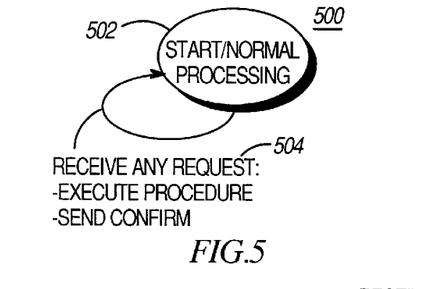
FIG. 5 shows a diagram of one embodiment of a server state machine wherein idempotent procedures are processed in accordance with the present invention.

FIG. 5, numeral 500, shows a diagram of one embodiment of a server state machine wherein idempotent procedures are processed in accordance with the present invention. Upon starting processing, (502) the server waits for a request. Upon receiving a request, the server executes a predetermined procedure, sends a confirm message (504), and then recycles to normal processing.

Figure 6:
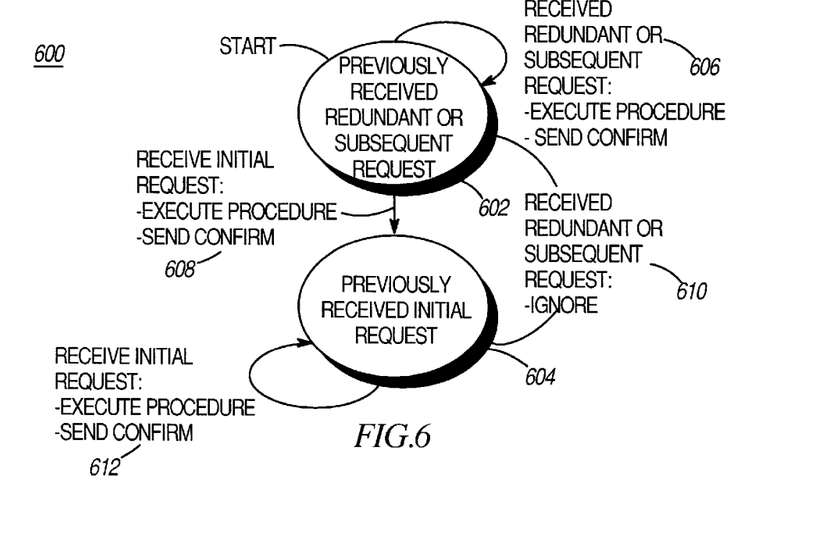
FIG. 6 shows one embodiment of a server state machine wherein non-idempotent procedures are processed in accordance with the present invention.

FIG. 6, numeral 600, shows one embodiment of a server state machine wherein non-idempotent procedures are processed in accordance with the present invention.

The server waits for one of an initial request, a redundant request, and a subsequent request (602). Where an initial request is received, the server executes a predetermined procedure, sends a confirm message to the client (608), and waits for the next request. Where one of a redundant request and a subsequent request is received, the server executes a predetermined procedure and sends a confirm message to the client (606). Where a previously received request is an initial request, and one of a redundant request and a subsequent request is next received, the server refrains from responding to the request, and recycles (610) to the state associated with a previously received redundant/subsequent request (602). Where a previously received request is an initial request, and another initial request is next received, the server executes the predetermined procedure, sends a confirm message, and recycles (612) to the state associated with a previously received initial request (604). In the non-idempotent case, the server does not confirm receipt of the next request message following the initial request message if the next request message is one of a redundant request and a subsequent request. Thus, it is necessary to distinguish between the initial request and any redundant or subsequent request.

To address the problem of varying round-trip delay over time, some existing technologies obtain estimates of round-trip delays from measurements, and use the estimates to adaptively update the time-out period for each connection. In Karn's algorithm, retransmission time-outs are combined with an exponential timer backoff strategy. In this scheme, the time-out period is normally derived from an estimate of the round-trip delay. If the timer expires and causes a retransmission, the time-out period will be adjusted upwards by a constant factor. This step is repeated each time there is a retransmission, unless the time-out period has already reached an upper-bound. After each timer backoff, the time-out value is retained for subsequent messages until a positive confirm message is obtained, and then the time-out value is reset to the normal one derived from the estimated round-trip delay.

Figure 7:
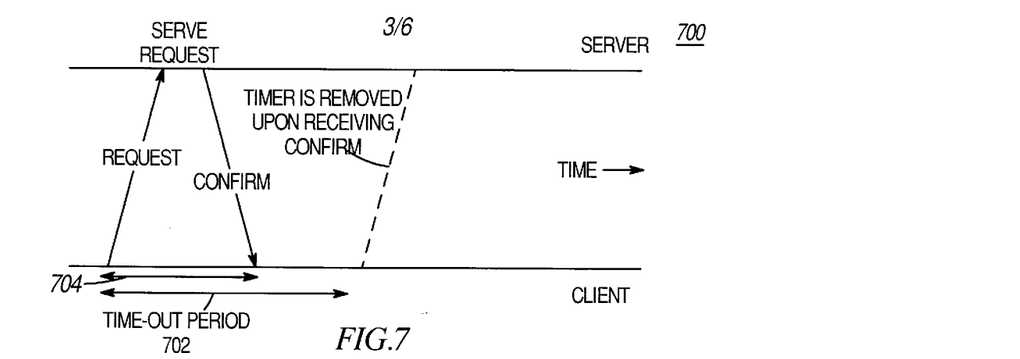
FIG. 7 shows a time sequence wherein an excessive time-out period is utilized for request-confirmation.
Figure 8:
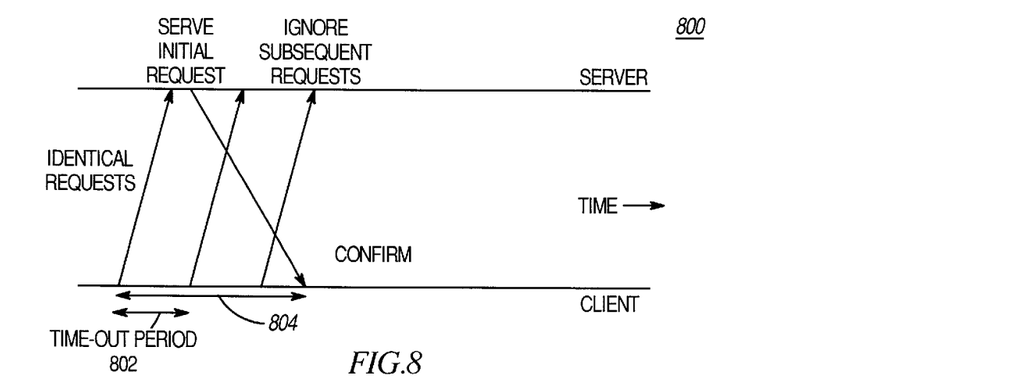
FIG. 8 shows a time sequence wherein an insufficient time-out period is utilized for request-confirmation.

Thus, with existing technologies, the time-out period is usually optimized with respect to each connection, depending on its round-trip delay. Where the time-out period (702) is larger than the round-trip delay (704), any lost request will take an unnecessarily long time to recover, as shown in FIG. 7, numeral 700. Where the time-out period (802) is smaller than the round-trip delay (804), there will normally be many redundant requests since the client normally keeps retransmitting the request after each repeated time-out period, until a round-trip delay later before the client can ever receive a confirm message, as shown in FIG. 8, numeral 800. These redundant requests consume bandwidth and exacerbate the harmful effects of non-idempotent procedures.

Thus, the ideal time-out period is seen to be the round-trip delay. For a connection with a large round-trip delay, the time-out period required may be so large that throughput is decreased significantly. For a connection with a small round-trip delay, the time-out period may be too small for some burst errors to be waited out. The amount of processing required for managing a timer is not quite trivial. To set a timer, one has to build a data structure that stores state (specifying when the timer is to expire) and control information (the steps to be taken upon expiration of the timer). The data structures of many pending timers are kept in a list that is sorted by chronological order. As each connection requires a timer, the number of timers required may be overwhelming. There can thus be considerable stress on processor and memory resources. In practice, very few timers actually expire. In this respect, much of the work on timer processing is wasted.

Using the present invention, the precision of the round-trip delay is unimportant. And, if the round-trip delay changes over time, the protocol is unaffected.

Moreover, adjustment of any parameter is unnecessary, as with other existing protocols such as Elements of Procedure in the HDLC (High level Data Link Control) protocol. With the present invention, a connection with a large round-trip delay is free from an unexpectedly long delay in recovering from a lost request message, and is free from many unnecessary and possibly harmful invocations of the procedure due to its timer expiring too often.

Since the timer values are independent of individual connections, the present invention may be implemented such that all connections in one multi-connection system share the same primary and secondary timers. This considerably reduces the processor and memory resources consumed in updating software timers.

When a client fails to receive a confirm message from the server prior to expiration of a timer, a request or confirm message may have been lost, or the round-trip delay may have been unexpectedly large. In case the round-trip delay has increased, there may be many retransmissions before the confirm message for the original request is received by the client. An exponential timer backoff approach (e.g., Karn's algorithm) minimizes unnecessary retransmissions when there is an increase in the round-trip delay. In this approach, there is a backoff whenever a retransmission is needed, even when the failure in receiving a confirm message is triggered by an event other than an increase in the round-trip delay. Hence, recovery from a lost message generally takes a longer time with timer backoff than without. The present invention lacks such a problem. Whether the round-trip delay has increased or a message has been lost, the redundant transmission of the request message can normally speed up recovery. The next retransmission after a secondary timer period, if needed, amounts to a one-step timer backoff. Since the probability that an additional retransmission is needed decreases exponentially with the number of retransmissions completed, recovery is rarely delayed by the secondary timer.

The performance of the invention in comparison with the Stop-and-Wait approach is set forth below, wherein the idempotent and non-idempotent cases separately are described. The performance comparison is in terms of the average time taken for a remote procedure call. The multiplicative inverse of this average time gives a measure of the throughput of the remote procedure call method.

Figure 9:
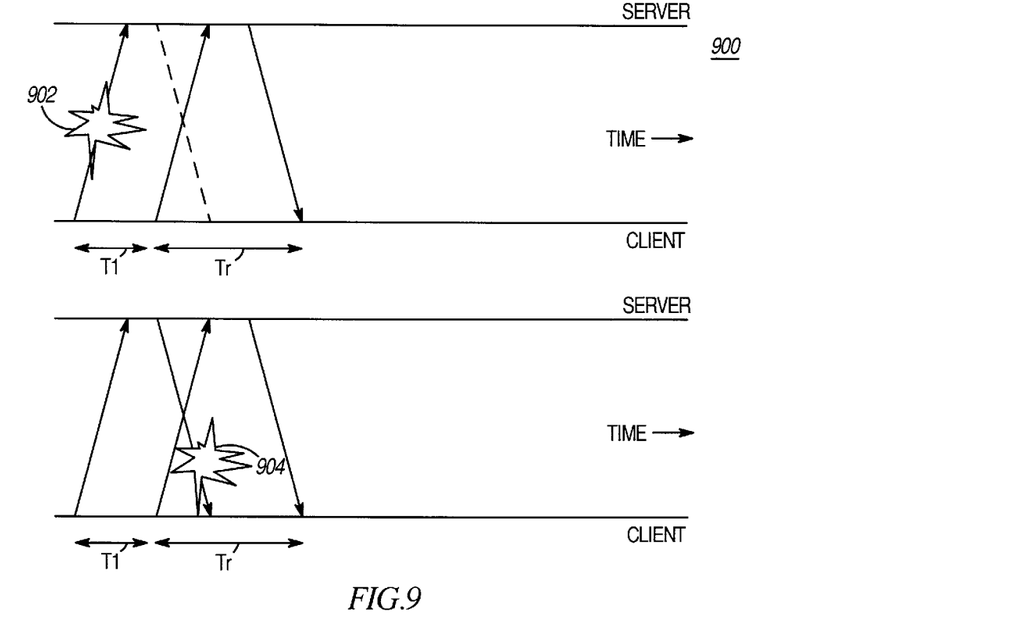
FIG. 9 shows two time sequence examples in an idempotent case in accordance with the method of the present invention, wherein a successful "hand-shake" is obtained after an initial "hand-shake" has failed.

FIG. 9, numeral 900, shows two time sequence examples in an idempotent case in accordance with the method of the present invention, wherein a successful "hand-shake" is obtained after an initial "hand-shake" has failed. In an idempotent case, let $T_r$ denote the round-trip delay. Let $T_1$ and $T_2$ denote the primary and secondary timer periods respectively. Let p be the probability that a request fails to be transmitted by the client and confirmed by the server (i.e., a failed "hand-shake"; a "hand-shake" is an exchange of predetermined signals whereby a connection is established for the transmission of a remote procedure call between a client and a server). FIG. 9 shows the two scenarios in which an initial "hand-shake" fails: where a server fails to receive a request from a client (902); and where the client fails to receive a confirm message from the server (904).

Figure 10:
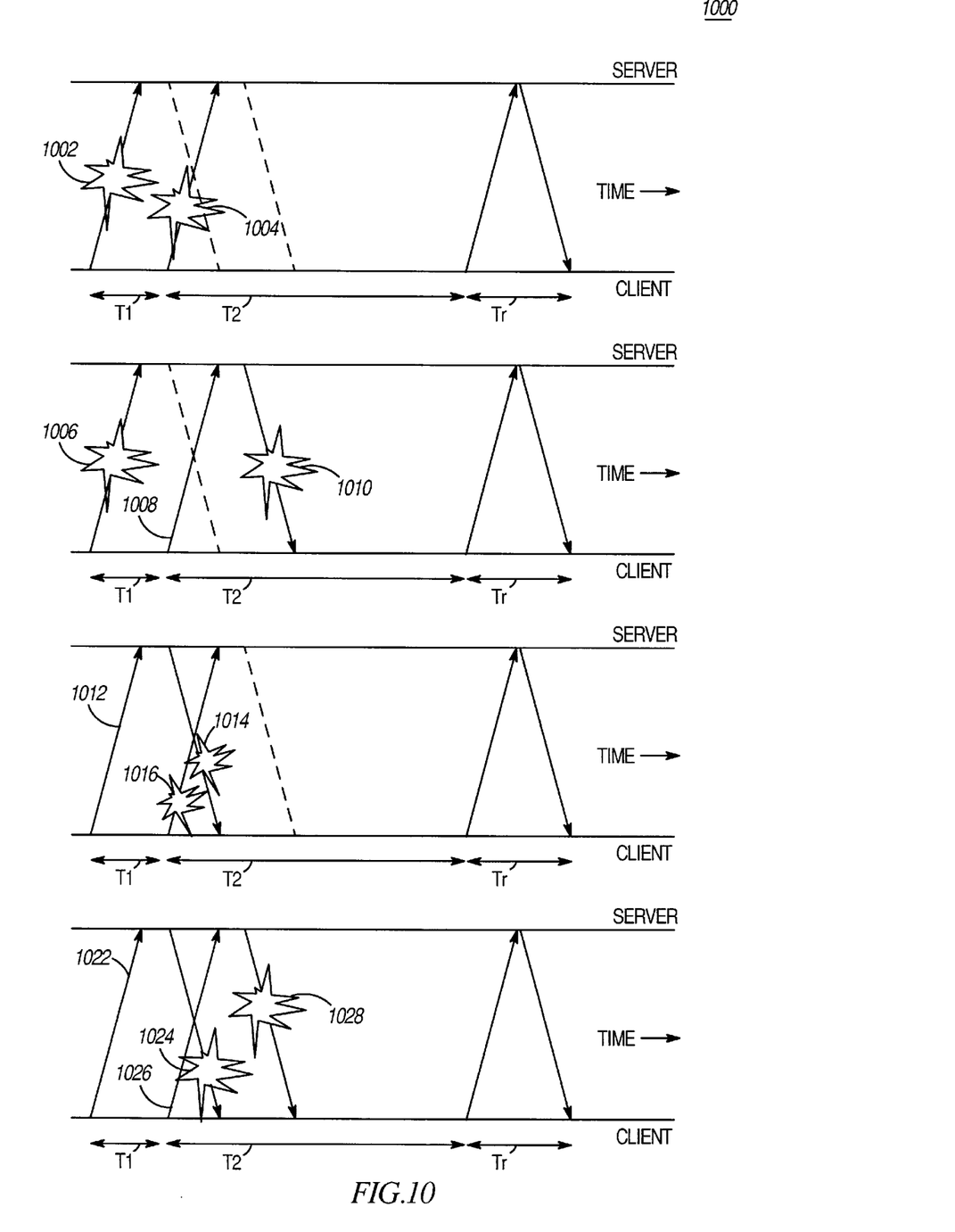
FIG. 10 illustrates four time sequence examples in an idempotent case in accordance with the method of the present invention, wherein a successful "hand-shake" is obtained after two initial "hand-shakes" have failed.

In FIG. 10, numeral 1000, four time sequence examples in an idempotent case, in accordance with the method of the present invention, are set forth in which two initial "hand-shakes" may fail: where a server fails to receive both an initial request (1002) and a redundant request (1004) from a client; where the server fails to receive an initial request (1006) from the client, the server receives a redundant request (1008), and the client fails to receive a confirm message (1010) for the redundant request; where the server receives an initial request (1012) from the client, the client fails to receive a confirm message (1014) for the initial request, and the server fails to receive a redundant request (1016) from the client; the server receives an initial request (1022) from the client, the client fails to receive a confirm message (1024) for the initial request from the server, the server receives a redundant request (1026) sent by the client, and the client fails to receive a confirm message (1028) for the redundant request from the server. In all four cases, after two failed "hand-shakes", there is a successful "hand-shake".

By inspecting the figures and generalization thereof, the following average time T* taken for each remote procedure call is obtained:

$$T^* = T_r + (1-p)p \sum_{k=0}^{\infty} (T_1 + kT_2)p^k$$

$$T^* = T_r + (1-p)pT_1 \left( \frac{1}{1-p} \right) + (1-p)p^2T_2 \left( \frac{1}{1-p} \right)^2$$

$$T^* = T_r + \left( \frac{p}{1-p} \right) \{(1-p)T_1 + pT_2\}$$

$T_r$ represents a round-trip delay time, p represents the probability that a request fails to be transmitted by the client and confirmed by the server, k represents an integer value from 0 to infinity, $T_1$ represents a value for a predetermined primary time-out period, and $T_2$ represents a value for a predetermined secondary time-out period.

Let $T_s$ be the average time per instance for the Stop-and-Wait protocol. It is well known that:

$$T_s = \frac{T_r}{1-p}$$

where, again, $T_r$ represents a round-trip delay time, and p represents the probability that a request fails to be transmitted by the client and confirmed by the server.

Thus, $$T^* = T_s - \left( \frac{p}{1-p} \right) \{T_r - \{(1-p)T_1 + pT_2\}\}$$

Hence, $T^* < T_s$ provided $T_r > (1-p)T_1 + pT_2$, and $T_1$ and $T_2$ may be selected such that the above inequality is satisfied. Therefore, the present invention will have a higher throughput (multiplicative inverse of T*) than that of the Stop-and-Wait protocol ($1/T_s$). Every initial request is reinforced after a primary time-out period by having a redundant request. Also, a secondary time-out period is incurred only after second or higher order events (i.e., it requires at least two failed "hand-shakes").

Figure 11:
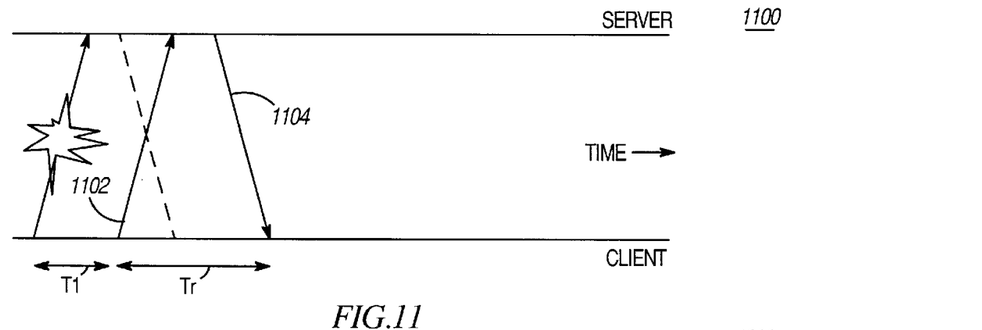
FIG. 11 shows a time sequence example in a non-idempotent case in accordance with the method of the present invention, wherein a successful "hand-shake" is obtained after an initial "hand-shake" has failed.

FIG. 11, numeral 1100, shows a time sequence example in a non-idempotent case in accordance with the method of the present invention, wherein a successful "hand-shake" is obtained after an initial "hand-shake" has failed. Let q be the probability that a message is lost in any direction of transmission. A "hand-shake" is obtained only if one request message (1102) and a corresponding confirm message (1104) are both received. Hence, p and q are related as follows:

$$p = q + (1-q)q$$

or $$(1-p) = (1-q)^2$$

where p represents the probability that a request fails to be transmitted by the client and confirmed by the server. $T_r$, the round trip delay for the resubmission of a request, is always incurred. Thus, the probability that the procedure call is completed after a delay of $(T_r+T_1)$ is $q(1-p)$.

Figure 12:
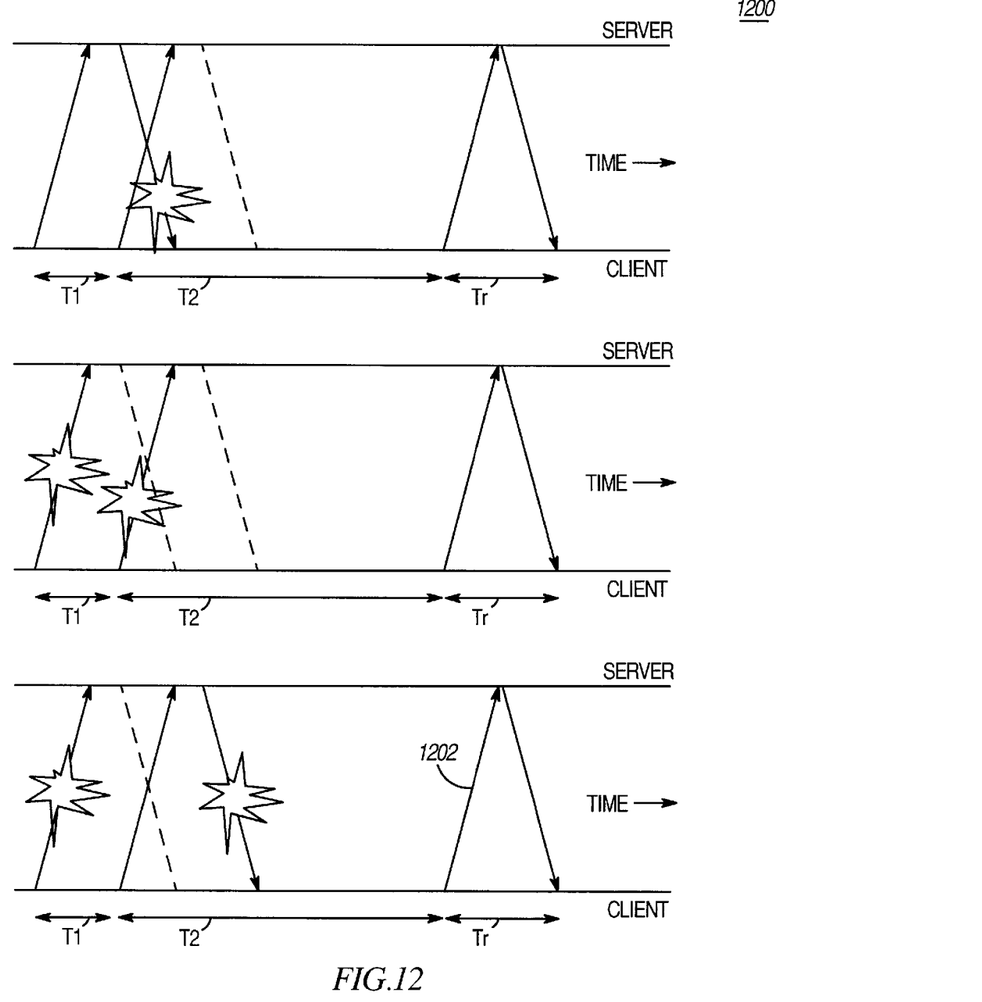
FIG. 12 shows three time sequence examples in a non-idempotent case in accordance with the method of the present invention, wherein a successful "hand-shake" is obtained after two initial "hand-shakes" have failed.

FIG. 12, numeral 1200, shows three time sequence examples in a non-idempotent case in accordance with the method of the present invention, wherein a successful "hand-shake" is obtained after two initial "hand-shakes" have failed (1202). As may be seen from FIG. 12, the probability that $T_2$ is incurred exactly once is $h(1-p)$ where $$h = (1-q)q + q^2 + q^2(1-q) = q(1-q) + qp.$$

The average time taken for each remote procedure call in the non-idempotent case is as follows:

$$T^* = T_r + p(1-p)\{1+p+p^2+p^3+\ldots\}T_1 + h(1-p)\{1+2p+3p^2+4p^3+\ldots\}T_2$$

Hence, $$T^* = T_r + pT_1 + \left( \frac{h}{1-p} \right) T_2$$

It follows that $$T^* = T_s - \left( \frac{p}{1-p} \right) \left\{ T_r - \left\{ (1-p)T_1 + \frac{h}{p} T_2 \right\} \right\}$$

Hence, $T^* < T_s$ provided $T_r > (1-p)T_1 + h/p\,T_2$.

Clearly, h/p tends to 0.5 as q tends to zero. In this case, a large $T_2$ may render a relatively small delay advantage. Nonetheless, for a very small p, and provided $T_2$ is less than a small integral multiple of $T_r$, T* may be less than $T_s$.

The present invention may be applied to the transmission of encoded data over an unreliable network. Error detection information is added prior to encoding. The encoder is reset using a reset protocol that uses a timer to generate further reset requests when the receiver fails to confirm them in a timely fashion. In the prior art, the decoder resets its timer upon expiration if it still has not received a confirm message from the encoder about the previous reset request. This step is repeated until the request is successfully confirmed.

Figure 13:
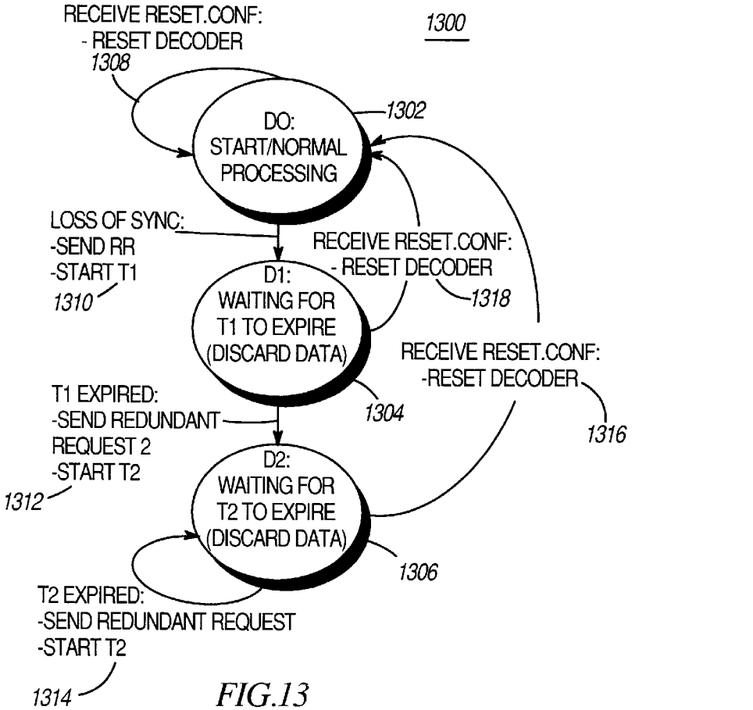
FIG. 13 shows one embodiment of steps for a decoder (client) state machine in accordance with the present invention.
Figure 14:
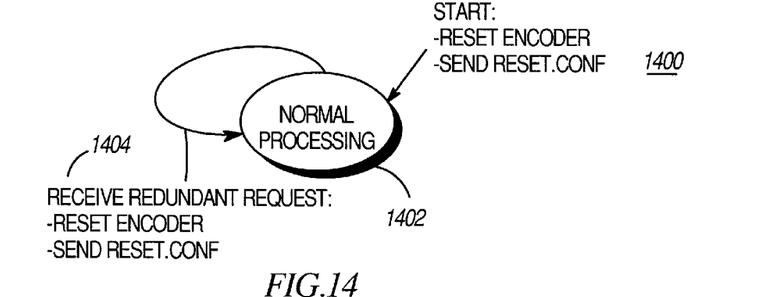
FIG. 14 shows one embodiment of steps for an encoder (server) state machine, in accordance with the present invention, which functions together with the decoder state machine of FIG. 13.

Data compression reset is a non-idempotent procedure for excessive frequency of resets can potentially affect the data compression ratio. Since the convergence time of the data compression algorithm in the prior art is small relative to the expected resynchronization interval, the redundant reset has little effect on the data compression performance. The non-idempotent version of the invention is more complicated to implement and has a lower delay performance than that of the idempotent version. In view of the above considerations, the preferred implementation is the idempotent version. To apply the present invention to a vocabulary reset scheme described, the decoder and encoder state machines may be implemented as shown in FIG. 13 and FIG. 14 respectively. In the figures, $T_1$ and $T_2$ denote the primary and secondary time-out periods respectively. RR denotes a reset request.

FIG. 13, numeral 1300, shows one embodiment of steps for a decoder (client) state machine in accordance with the present invention. The decoder state machine has three states: Start/Normal Processing (D0) (1302), Waiting for $T_1$ to Expire (D1) (1304), and Waiting for $T_2$ to Expire (D2) (1306). In state DO (1302), upon receiving a reset confirmation (RESET.conf.), the decoder performs a reset operation (1308), and returns to the D0 state (1302). While in state D0 (1302), the decoder is either waiting for the encoder to initiate synchronization, or is already in synchronization with the encoder, and is decoding data in a predetermined fashion. When the decoder detects loss of synchronization, it sends a reset request (RR), starts timer $T_1$, and goes into state D1 (1310). While in state D1 (1304), the decoder waits for either a reset confirmation or for $T_1$ to expire. In state D1, data is discarded without being decoded, and further loss of synchronization indications is ignored. If a reset confirmation is received, the decoder returns to state D0 (1318). If $T_1$ expires, the decoder sends an additional reset request (RR2), starts timer $T_2$, and goes to state D2 (1312). While in state D2, the decoder waits for a period of $T_2$ (typically longer than $T_1$) for reset confirmation (1306). In this state, data is discarded and further loss of synchronization indications is also ignored. If a reset confirmation is received, the decoder goes back to state D0 (1316). If $T_2$ expires, the decoder sends another reset request and restarts the $T_2$ timer (1314). This process is repeated until a reset confirmation is received. As shown in FIG. 14, numeral 1400, the encoder state machine which functions together with the decoder of FIG. 13, simply has one state, normal processing (1402). The encoder always resets itself and sends RESET.conf upon receipt of each reset request from the Decoder (1404). For initialization of synchronization, the encoder resets itself and sends a RESET.conf to the decoder.

Figure 15:
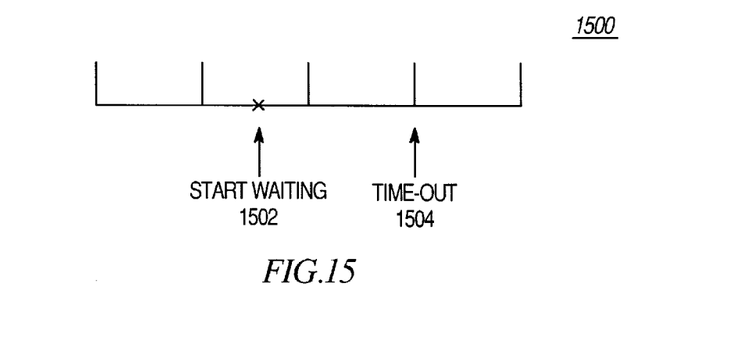
FIG. 15 shows a time line wherein primary and secondary timers are replaced with a primary and a secondary virtual timer, respectively, implemented by slotted time clocks in accordance with the present invention.

With all connections using the same primary and secondary time-out periods, the primary and secondary timers may be replaced with a primary and a secondary virtual timer, respectively, implemented for example, by slotted time clocks. That is, where the point in time that a given timer is to be started falls within a given time slot (1502), the corresponding virtual timer will expire at the end of the next time slot (1504), as shown in FIG. 15, numeral 1500.

The invention may also be applied to a wide range of applications, such as encryption, authentication, modem training, rate negotiation, and other reliable light-weight (i.e., non-stream) transport protocols over unreliable communication channels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing a remote procedure call from a client to a server via an unreliable communication channel using a plurality of retransmission timers, comprising the steps of:

(A) transmitting, by the client to the server, a request and waiting for a confirm message, (B) retransmitting, by the client to the server, the request after each of a predetermined sequence of time-out periods implemented by the plurality of retransmission timers until a confirm message is received, wherein the predetermined sequence of time-out periods begins with a primary time-out period, followed by a predetermined number of repetitions of a secondary time-out period that is preselected to be greater than the primary time-out period.

2. The method of claim 1 wherein, where a plurality of client-server pairs share a retransmission timer that determines the primary time-out period, and the primary time-out period is:

(A) greater than a predetermined duration of burst errors; and (B) less than any round-trip delays of the client-server pairs sharing the retransmission timer.

3. The method of claim 1 wherein, where a plurality of client-server pairs share a retransmission timer that determines the secondary time-out period, and the secondary time-out period is:

(A) greater than any round-trip delays of the client-server pairs sharing the retransmission timer; and (B) less than a predetermined time-out for disconnect of predetermined higher layer protocols.

4. The method of claim 1 wherein the predetermined sequence of time-out periods consists of at least one of:

(A) a primary time-out period $T_1$ that is repeated a first predetermined number of times; and (B) a secondary time-out period $T_2$ that is repeated a second predetermined number of times.

5. The method of claim 4 wherein a third time-out period $T_3$ follows after the secondary time-out, and, where selected, is repeated a predetermined number of times.

6. The method of claim 1 wherein the predetermined sequence of time-out periods consists of a primary time-out period and a secondary time-out period that are alternately implemented for a predetermined number of cycles.

7. A communication system for providing a remote procedure call from a client to a server via an unreliable communication channel, wherein the client:

transmits a request to the server;

waits for a confirm message from the server; and retransmits the request to the server after each of a predetermined sequence of time-out periods implemented by a plurality of retransmission timers until the confirm message is received;

and wherein the predetermined sequence of time-out periods begins with a primary time-out period and is followed by a predetermined number of repetitions of a secondary time-out period that is preselected to be greater than the primary time-out period.

8. The communication system of claim 7 wherein:

upon starting processing, an initial request is sent by the client and the predetermined primary time-out period $T_1$ is begun by a first timer;

the client then waits for $T_1$ to expire;

where a confirm message is received during $T_1$, the client cancels $T_1$ and recycles to starting processing;

where $T_1$ expires without the client's receiving a confirm message, the client sends a redundant request and a predetermined secondary time-out period $T_2$ is begun by starting a second timer;

the client then waits for $T_2$ to expire;

where a confirm message is received during $T_2$, the client cancels $T_2$ and recycles to starting processing;

where $T_2$ expires without the client's receiving a confirm message, the client sends a subsequent request, starts another time-out period of length $T_2$, then recycles to waiting for $T_2$ to expire, repeating sending the subsequent request until one of:

(1) the client receives a confirm message; and (2) a predetermined number of subsequent requests have been sent.

9. The communication system of claim 7 for executing an idempotent procedure, wherein the server, upon receiving a request from the client:

executes a predetermined procedure; and sends a confirm message to the client.

10. The communication system of claim 7 for executing a non-idempotent procedure, wherein the server:

waits for one of an initial request, a redundant request, and a subsequent request;

where an initial request has been received, the server executes a predetermined procedure and sends a confirm message to the client;

where one of a redundant request and a subsequent request is received, the server executes a predetermined procedure and sends a confirm message to the client;

where a previously received request is an initial request, and one of a redundant request and a subsequent request is next received, the server refrains from responding to the request; and where a previously received request is an initial request, and another initial request is next received, the server executes the predetermined procedure and sends a confirm message to the client.

11. A communication system for synchronizing transmission of encoded data between an encoder and a decoder over an unreliable communication channel, the communication system providing a remote procedure call characterized by the decoder transmitting a request for synchronization to the encoder and retransmitting the request after each of a predetermined sequence of time-out periods implemented by a plurality of retransmission timers until a confirmation message is received by the decoder from the encoder, wherein:

the encoder includes an encoder state machine having one state to which the encoder always returns after it resets itself and sends a confirm message to the decoder upon receipt of each reset request from the decoder; and the decoder includes a decoder state machine comprising:

a first processing state (D0) in which an initial request is sent;

a first waiting state (D1) for causing the decoder to wait for a primary time-out period before sending a redundant request; and a second waiting state (D2) for causing the decoder to wait for a secondary time-out period before sending a subsequent request;

wherein primary time-out period is preselected to be greater than or equal to a predetermined error event time and wherein the secondary time-out period is preselected to be greater than the primary time-out period.

12. The communication system of claim 11 wherein, for each encoder-decoder pair, in state D0, upon the decoder state machine receiving a reset confirmation, performing, by the decoder state machine, a reset operation, and returning to the D0 state;

while in state D0, one of:

(A) waiting, by the decoder state machine, for an encoder to initiate synchronization; and (B) decoding, by the decoder state machine, being already in synchronization with the encoder, data in accordance with a predetermined decoding scheme;

upon the decoder state machine detecting a loss of synchronization, sending, by the decoder state machine, a reset request, starting a timer $T_1$, and going into state D1;

waiting, while in state D1, by the decoder state machine, for one of: a reset confirmation and expiration of $T_1$;

discarding, in state D1, by the decoder state machine, data without the data being decoded, and ignoring further loss of synchronization indications;

resetting, by the decoder state machine, where a reset confirmation is received, to state D0;

sending, by the decoder state machine, where $T_1$ expires, an additional reset request, starting timer $T_2$, and going to state D2;

waiting, by the decoder state machine, while in state D2, until expiration of timer $T_2$ for reset confirmation;

discarding, by the decoder state machine, in state D2, data and ignoring further loss of synchronization indications;

returning, by the decoder state machine, where a reset confirmation is received, to state D0; and sending, by the decoder state machine, where $T_2$ expires, another reset request and restarting the $T_2$ timer, and repeating sending reset requests until one of: a reset confirmation is received and a predetermined number of reset requests have been sent.

13. The communication system of claim 12 wherein retransmission timers for the primary time-out period and the secondary time-out period are implemented by virtual timers.

14. The communication system of claim 13 wherein the virtual timers are slotted time clocks.

* * * * *